H. H. ROYALL.
RANGE FINDER.
APPLICATION FILED MAY 22, 1909.
934,841.
Patented Sept. 21, 1909.
2 SHEETS—SHEET 1.
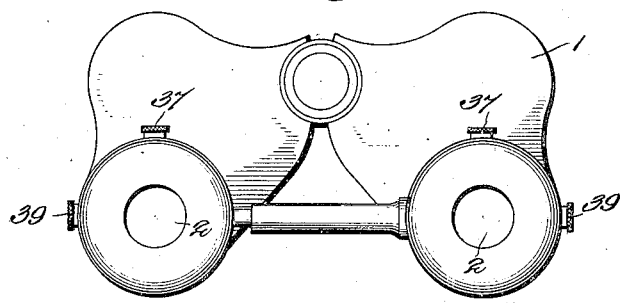
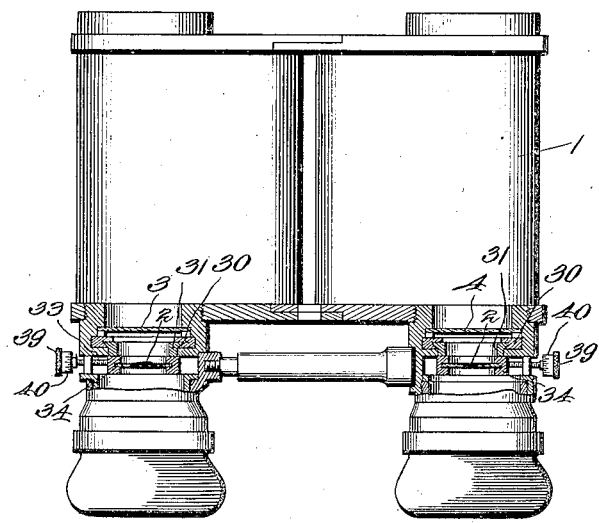
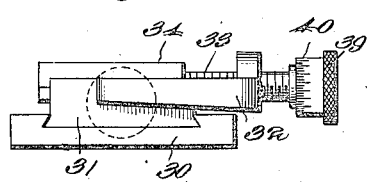
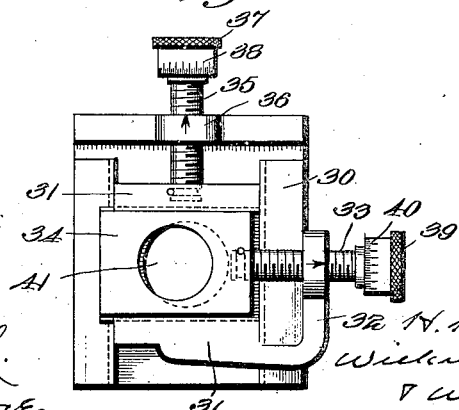
Witnesses
W. May Dowall
Jas E. Dodge
Inventor
H. H. Royall by
Wilkinson Fisher
& Witherspoon
Attorneys

H. H. ROYALL.
RANGE FINDER.
APPLICATION FILED MAY 22, 1909.

934,841.

Patented Sept. 21, 1909.
2 SHEETS—SHEET 2.

Witnesses
W. Mat. Durall.
Jas. E. Dodge

Inventor
H. H. Royall by
Wilkinson Fisher
Wilkinson
Attorneys

UNITED STATES PATENT OFFICE.

HILARY H. ROYALL, OF THE UNITED STATES NAVY.

RANGE-FINDER.

934,841.  Specification of Letters Patent.  Patented Sept. 21, 1909.

Application filed May 22, 1909. Serial No. 497,694.

*To all whom it may concern:*

Be it known that I, HILARY H. ROYALL, a citizen of the United States, and a lieutenant in the U. S. Navy, stationed on board the U. S. S. *Kearsarge*, have invented certain new and useful Improvements in Range-Finders; and I do hereby declare the following to be a full, clear, and exact description of the invention, such as will enable others skilled in the art to which it appertains to make and use the same.

This invention relates to range finders of the binocular type, and has for its object to produce a simple inexpensive and an efficient device of this nature which will measure the distance between two objects, when the dimensions of one of them is known.

With these and other objects in view the invention consists in the novel details of construction and combinations of parts more fully hereinafter disclosed and particularly pointed out in the claims.

Figure 5:
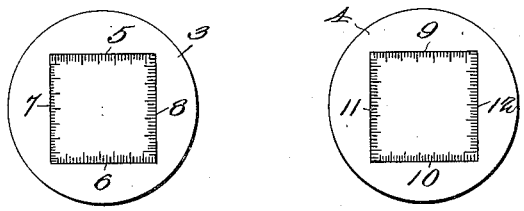
Figure 6:
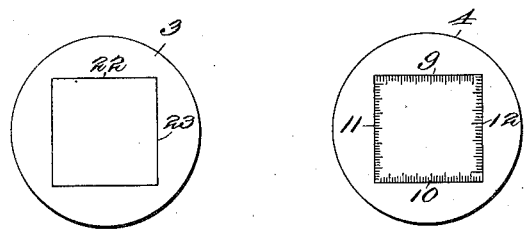
Figure 7:
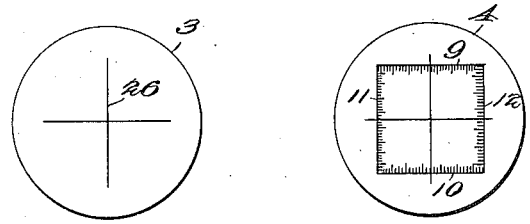
Figure 8:
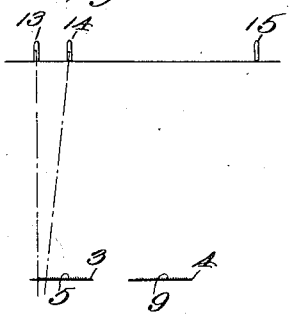

Referring to the accompanying drawings forming a part of this specification:—Figure 1 is an end view of a pair of binoculars with my invention applied thereto; Fig. 2 is a plan view, partly in section, of the same; Fig. 3, is an elevational view of the means for adjusting the eye pieces; Fig. 4 is a side view of the parts shown in Fig. 3; Fig. 5, is an elevational view of a set of scales that are located in the focus of the binoculars; Fig. 6, is a view of a modified form of scales; Fig. 7, is a view of a further modified form of scales; Fig. 8, is a diagrammatic view showing how horizontal distances are measured by this invention; and Fig. 9, is a like view showing how vertical distances are measured.

1 represents the barrels of a pair of binocular telescopes preferably of the reflecting prism type, 2 the eye pieces or eye lenses thereof, 3 a transparent scale support placed in the focus of the left eye piece, and 4 a similar support placed in the focus of the right eye piece. On the support 3 is an upper horizontal scale 5, and a lower horizontal scale 6, a left vertical scale 7 and a right vertical scale 8. The numerals 9, 10, 11, and 12, respectively, represent corresponding scales on the right scale support 4.

It is well known that when a pair of telescopic binoculars are focused on a distant object only one image is seen, and that, therefore, if the above scales are placed in the focuses of their respective eye pieces, said scales will be superposed and only one set of scales will be seen. It is, also, well known that the relative dimensions of a distant object will appear in the focal image; and therefore, if the above scales are used such dimensions may be read off on one of said scales. Likewise it is apparent, if one of the eye pieces, say the left one, is horizontally adjusted so as to laterally displace its image, two images of the same object will be seen. From this it is also apparent that if two objects were viewed in the first place, the image of one object as seen in one eye may, by adjusting one eye piece, be brought to coincide with an image of the other object as seen in the other eye. To make this point clear, suppose the binoculars are focused on the objects 13, 14, and 15, Fig. 8, and all of the said objects are clearly seen through the now superposed scales 9 and 5; and further suppose the objects 13 and 14 are observed to subtend say ten points, on the scale 5. Now by suitably adjusting in a horizontal direction one of the eye pieces, say the left one, the scales will be seen to separate, and two images will appear. As the adjustment continues the images of points 13 and 14, together with the scales 5 to 8 that are seen through the right eye piece, will appear to remain stationary, while the images of these points, and scales 9 to 12, as seen through the left eye piece will appear to approach or to recede from the first images according to the direction in which the left eye piece is adjusted. Suppose, however, the left eye piece is moved in such a direction as to cause the image of the point 15, as seen in the left eye piece, to coincide with the image of the point 14, as seen in the right eye piece. The scales in the left barrel of the binocular will apparently move, while the scales in the right side will apparently remain stationary, so that when the point 15 has apparently coincided with the point 14, we may read off on the scale 9 the number of divisions the scale 5 has apparently moved relatively thereto. Suppose such reading shows 180 divisions; knowing that the points 13 and 14 subtended only 10 points, or divisions, we would then know that the point 15 is 18 times farther from the point 14 than is the point 14 from the point 13. If the points 13 and 14 are known to be 100 yards apart, then the point 15 is 1800 yards from the point 14, or is 1900 yards from the point 13.

Figure 9:
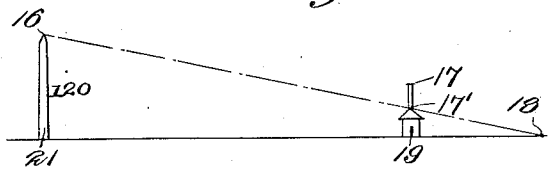

In the same way it is obvious that if the scales are moved vertically instead of horizontally, distances directly in the line of sight can be measured provided the observer is sufficiently elevated, as will be clear from Fig. 9. In this figure suppose the observer is situated on the point 16, and he wishes to know how far beyond the point 19 is the point 18, the height of the point 17 being known. He would vertically adjust his eye piece until the point 18 apparently coincides with the point 19, and then read off on the vertical scales 11 and 12, the amount of the displacement suffered by the vertical scales 7 and 8. Suppose the height of the point 17 is known to be 40 feet and it subtends ten divisions on the vertical scale 11. Now if it is found that the scales 7 and 11 are relatively displaced 5 divisions when the points 18 and 19 coincide, in the field of view, we will know that the distance between points 17′ and 19 is one-half the height of the point 17, or 20 feet. The distance of the point 18 can then by a similarity of triangles shown in Fig. 9, be easily found.

It is evident if in Fig. 8 the point 15 is not at right angles to the points 13 and 14, but is disposed nearer to or farther away from the observer, that its distance can still be measured by getting its proportionate displacement on both the horizontal and on the vertical scales according to the principles just stated. In other words, if said point 15 is farther away than are the points 13 and 14, when the horizontal scales are adjusted point 15 will not coincide with said point 14, but will be above it in the field of view; and therefore, an adjustment of the vertical scales will be necessary in order to determine the two sides of a right angled triangle of which the hypotenuse is the desired distance.

It is evident that one of the scale supports as 3, may be simply provided with straight lines 22, 23 while the other support 4 is graduated as indicated in Fig. 6. Or, as illustrated in Fig. 7, the support 3 may be provided with crossed lines 26, while the other support 4 is graduated, as shown, and also provided with crossed lines. The graduations or markings on the supports 3 and 4, may be made in any suitable manner, as for example, by photographing the same thereon, and they are preferably made very fine, say 300 to 500 to the inch.

In order to provide a convenient means for moving the eye pieces both vertically and horizontally, I preferably mount them in the frame shown in Figs. 3 and 4, which consists of the base piece 30, secured to the binocular frame, in which moves the vertical slide 31, provided with the arm or lug 32, through which passes the micrometer screw 33, controlling the horizontal slide 34, adapted to move across the face of said vertical slide and at right angles to the same, as shown. A micrometer screw 35 passing through the lug 36 of the base piece controls the movement of the vertical slide, as shown.

The screw 35 is provided with a milled head 37, and scale 38, and the screw 33 is provided with a milled head 39 and scale 40. The function of these scales 38 and 40, is to enable one to readily bring the eye pieces back to their zero positions after they have been displaced in the manner above described; and also to readily find the most accurate positions for the zero of said eye pieces, when about to use the instrument. It is obvious that a level may be attached to the binoculars, if desired.

The eye piece or lens 2 fits in the hole 41 and it is clear that an adjustment of the screw 35 will move both slides 31 and 34 up or down, while an adjustment of the screw 33 will only move the slide 34 horizontally. It is also evident that any other suitable form of adjustment may be employed for the eye pieces.

It is obvious that changes in the details of construction and arrangement of parts may be made by those skilled in the art without departing from the spirit of my invention, therefore I do not wish to be limited to such features, except as may be required by the claims.

What I claim is:

1. In a range finder the combination of a pair of binoculars provided with eye pieces; a measuring device comprising a plurality of scales located in the focus of said eye pieces; and means adapted to displace one of said eye pieces in two directions at an angle to each other; substantially as described.

2. In a range finder the combination of a pair of binoculars having eye pieces; a pair of supports located in the focus of the same, one of which is provided with a scale; a pair of slides for one of said eye pieces adapted to move the same in two directions at right angles to each other; and means to adjust said slides at will; substantially as described.

3. In a range finder the combination of a pair of binoculars having eye pieces; a pair of scales located in the focus of each eye piece; a pair of slides for moving each eye piece; and means by which said slides may be adjusted in directions at substantially right angles to each other; substantially as described.

4. In a range finder the combination of a pair of telescopic binoculars, having eye pieces; a scale support, provided with four scales located in the focus of each eye piece; a base plate; a slide mounted thereon; a second slide mounted on the first slide and supporting one of said eye pieces; and means for moving said slides at right angles to each other; substantially as described.

In testimony whereof, I affix my signature, in presence of two witnesses.

HILARY H. ROYALL.

Witnesses:
    THOS. S. LOUDERBACK,
    F. M. GUINN.